US009688171B2

(12) United States Patent
Yokoyama et al.

(10) Patent No.: US 9,688,171 B2
(45) Date of Patent: Jun. 27, 2017

(54) VEHICLE SEAT

(71) Applicant: TACHI-S Co., Ltd., Akishima-shi, Tokyo (JP)

(72) Inventors: Taichi Yokoyama, Akishima (JP); Tomonori Takahashi, Wako (JP); Yozo Furuta, Wako (JP)

(73) Assignee: TACHI-S CO., LTD., Akishima-Shi, Tokyo (JP)

( * ) Notice: Subject to any disclaimer, the term of this patent is extended or adjusted under 35 U.S.C. 154(b) by 0 days.

(21) Appl. No.: 14/931,483

(22) Filed: Nov. 3, 2015

(65) Prior Publication Data
US 2016/0121766 A1    May 5, 2016

(30) Foreign Application Priority Data
Nov. 5, 2014   (JP) ................. 2014-225308

(51) Int. Cl.
*B60N 2/46*   (2006.01)
*B60R 7/04*   (2006.01)

(52) U.S. Cl.
CPC .......... *B60N 2/468* (2013.01); *B60N 2/4606* (2013.01); *B60R 7/043* (2013.01)

(58) Field of Classification Search
CPC ........ B60N 2/463; B60N 2/4606; B60N 3/08; B60R 7/043
See application file for complete search history.

(56) References Cited

U.S. PATENT DOCUMENTS

| 4,174,866 | A | * | 11/1979 | Rhyan | ............... A47C 7/62 248/210 |
| 5,997,081 | A | * | 12/1999 | Kayumi | ............ B60N 2/4606 297/188.14 |
| 6,257,661 | B1 | * | 7/2001 | Eberle | ............... A47C 7/70 297/188.2 |
| 2012/0043789 | A1 | * | 2/2012 | Lee | ............... B60N 3/08 297/188.06 |

FOREIGN PATENT DOCUMENTS

JP     H10-194045 A     7/1998

* cited by examiner

*Primary Examiner* — Philip Gabler
(74) *Attorney, Agent, or Firm* — McGinn IP Law Group, PLLC

(57) ABSTRACT

A vehicle seat includes an armrest having a body provided with a recessed portion recessed toward a widthwise inward direction of the seat in such a manner as to surround a shaft member, and a hook member attached to a distal end of the shaft member and fitted in the recessed portion. The hook member includes a presser portion for pressing a skin layer of the armrest with the skin layer gripped between the presser portion and the body of the armrest, a baggage engagement portion extending from the presser portion in a widthwise outward direction of the seat for hooking engagement with the baggage, and a flange portion located at a distal end of the baggage engagement portion and extending in a direction substantially perpendicular to an axis of the shaft member for preventing the baggage from displacing off the hook member.

9 Claims, 5 Drawing Sheets

VEHICLE SEAT

FIELD OF THE INVENTION

The present invention relates to a vehicle seat configured to allow baggage or articles to be hooked on the seat.

BACKGROUND OF THE INVENTION

Vehicle seats generally consist of a seat cushion for being seated by a passenger or occupant, and a seatback for supporting the back of the occupant. Some seats include an armrest provided on a lateral portion of the seatback, and a hook member is provided on the armrest for allowing baggage or articles to be hooked on the hook member. A typical example of such vehicle seats is disclosed in Japanese Patent Application Laid-open Publication (JP-A) No. 10-194045.

In the vehicle seat disclosed in JP 10-194045A, the armrest includes a body covered with a skin layer and is pivotably mounted to undergo pivotal movement in forward and backward directions about a shaft member fixed to the lateral portion of the seatback.

A cushion material enclosing a body of the armrest has a recessed portion formed therein at a part around the shaft member, the recessed portion being recessed in a widthwise or lateral inward direction of the seat in such a manner as to surround the shaft member. The hook member for hooking the baggage is fitted in the cushion material so as to close the recessed portion. The hook member includes a bottom portion covering a bottom of the recessed portion, a cylindrical portion extending from an outer peripheral edge of the bottom portion in a lateral outward direction of the seat, and a baggage engagement portion extending upwardly from a lower part of a peripheral edge of the distal end of the cylindrical portion for allowing the baggage to be hooked thereon.

The hook member provided on the vehicle seat shown in JP 10-194045 is not fully satisfactory in terms of mounting strength because baggage that can be hooked on the hook member is limited to a relatively light-weight article.

With the foregoing prior problem in view, an object of the present invention is to provide a vehicle seat provided with a hook member having an enhanced mounting strength.

SUMMARY OF THE INVENTION

According to one aspect of the present invention, there is provided a vehicle seat comprising: a seat back; an armrest mounted on a lateral portion of the seatback; and a hook member provided on the armrest for allowing baggage to be hooked on the hook member. The armrest includes a body covered with a skin layer and is pivotably mounted to undergo pivotal movement in forward and backward directions about a shaft member fixed to the lateral portion of the seatback. The body of the armrest has a recessed portion formed therein and recessed in a widthwise inward direction of the seat in such a manner as to surround the shaft member. The hook member is attached to a distal end of the shaft member and fitted in the recessed portion. The hook member includes a presser portion for pressing the skin layer with the skin layer gripped between the presser portion and the body of the armrest, a baggage engagement portion extending from the presser portion in a widthwise outward direction of the seat for hooking engagement with the baggage, and a flange portion located at a distal end of the baggage engagement portion and extending in a direction substantially perpendicular to an axis of the shaft member (16) for preventing the baggage from displacing off the hook member.

With this arrangement, partly because the armrest includes the body covered with the skin layer and is pivotably mounted to undergo pivotal movement in the forward and backward direction about the shaft member, partly because the body of the armrest has the recessed portion recessed in the lateral inward direction of the seat in such a manner as to surround the shaft member, and partly because the hook member is attached to the distal end of the shaft member and fitted in the recessed portion, the hook member is supported by the shaft member and the body of the armrest. The shaft member is attached to the lateral portion of the seatback and has a high mounting strength. Since the hook member is directly attached to the shaft member having such a high mounting strength, and since the hook member is fitted in the body of the armrest, a mounting strength of the hook member is very high. The hook member can thus possess an enhanced mounting strength with respect to the vehicle seat.

Preferably, the flange portion includes a folded section extending in the widthwise inward direction of the seat. The flange portion including the folded section is a portion which is located at the distal end of the baggage engagement portion and extends in a direction substantially perpendicular to the axis of the shaft member for preventing the baggage from displacing off the hook member. A vertical movement of the baggage, which may occur at the distal end of the baggage engagement portion, can effectively suppressed by the folded section of the flange portion with the result that the baggage can be reliably kept in a hooked state on the baggage engagement portion without detachment.

Preferably, the baggage engagement portion and the flange portion have circular shapes having a common center coincident with an axis of the shaft member when viewed in a lateral side of the seatback. With this arrangement, an angle of inclination (or swing angle) of the armrest does not affect the usability of the hook member. The hook member can therefore possess a higher degree of usability.

Preferably, the armrest includes a first portion provided for attachment thereto of the hook member, and a second portion located forwardly of the first portion, and the armrest has a width set to be larger at the second portion than at the first portion. With this arrangement, since an amount of projection of the hook member in the lateral outward direction of the seat can be suppressed even though the hook member is attached to the shaft member 16, the baggage hooked on the hook member has a limited amount of projection in the lateral outward direction of the seat. The baggage can thus be hooked on the hook member with only a limited occupation of space provided on a lateral side of the automobile seat.

DETAILED DESCRIPTION OF THE PREFERRED EMBODIMENT

Figure 1:
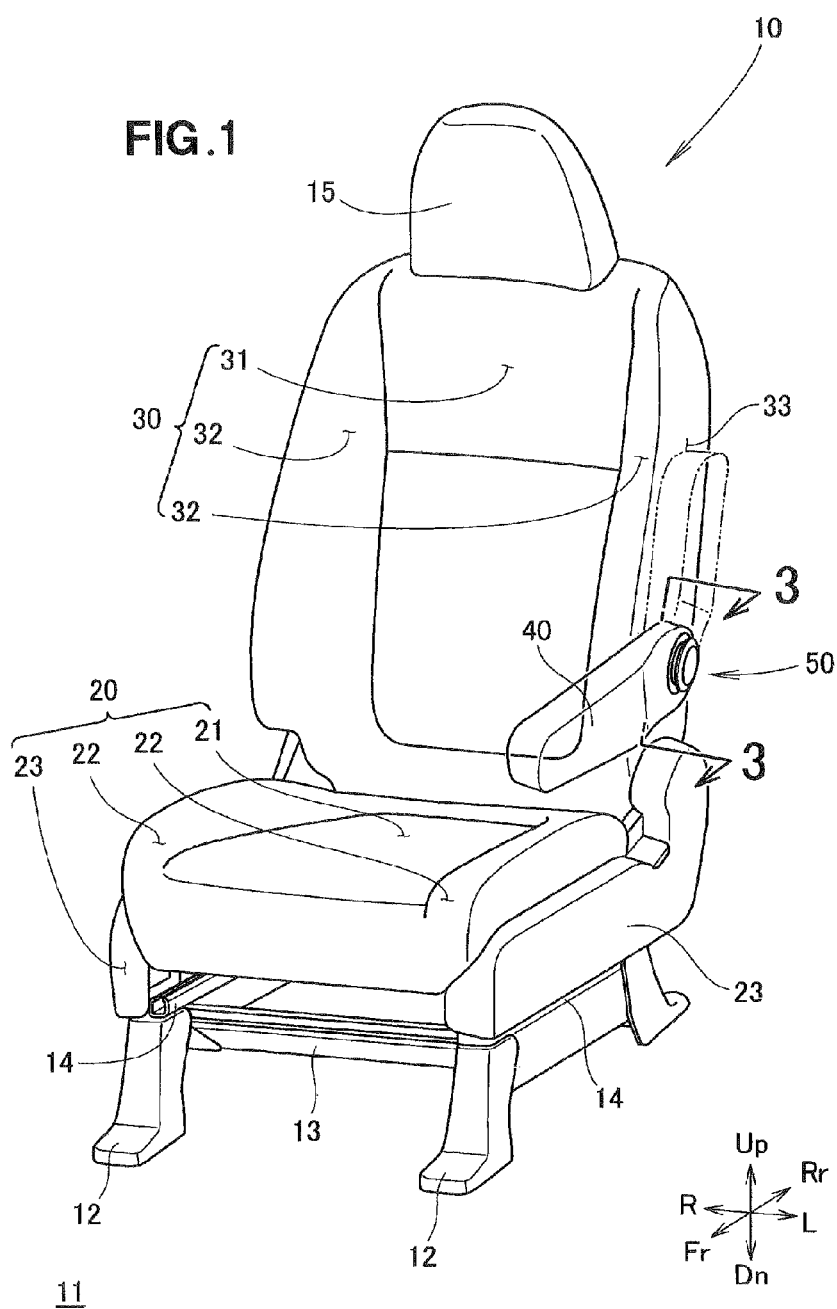
FIG. 1 is a perspective view of a vehicle seat used as an automobile seat according to a preferred embodiment of the present invention.

A certain preferred structural embodiment of the present invention will be described in detail below, by way of example only, with reference to the accompanying sheets of drawings. In the following description, the terms "left" and "right" are used to refer to directions as viewed from a human operator or driver in a vehicle, and the terms "front" and "rear" are used to refer to directions with respect to an advancing direction of the vehicle. In the drawings, "Fr", "Rr", "L", "R", "Up", and "Dn" indicate respectively "forward", "rearward", "leftward as viewed from the occupant", "rightward as viewed from the occupant", "upward", and "downward".

FIG. 1 shows an automobile seat 10, which represents an example of vehicle seat embodying the present invention. The automobile seat 10 is used as a driver's seat for a right steering wheel vehicle.

The automobile seat 10 includes left and right leg portions 12, 12 fixed to a vehicle floor 11, a connecting portion 13 extending crosswise between the left and right leg portions 12, 12, left and right rails 14, 14 fixed to respective upper parts of the left and right leg portions 12, 12, a seat cushion 20 slidably supported via the rails 14, 14 for undergoing sliding movement in front and rear directions of the seat 10, a seatback 30 rising upward from a rear end of the seat cushion 20, a headrest 15 provided on an upper end of the seatback 30, and an armrest 40 attached to a lateral portion 33 of the seatback 30.

The seat cushion 20 includes a seating portion 21 for being seated by the occupant or driver, left and right support portions 22, 22 bulging upwardly from opposite lateral ends of the seating portion 21, and cushion support portions 23, 23 made of resin and provided on lateral outer sides of the left and right support portions 22, 22.

The seatback 30 includes a backrest portion 31 for supporting the back of the occupant, and left and right side support portions 32, 32 bulging forwardly from opposite lateral ends of the backrest portion 31.

Figure 2:
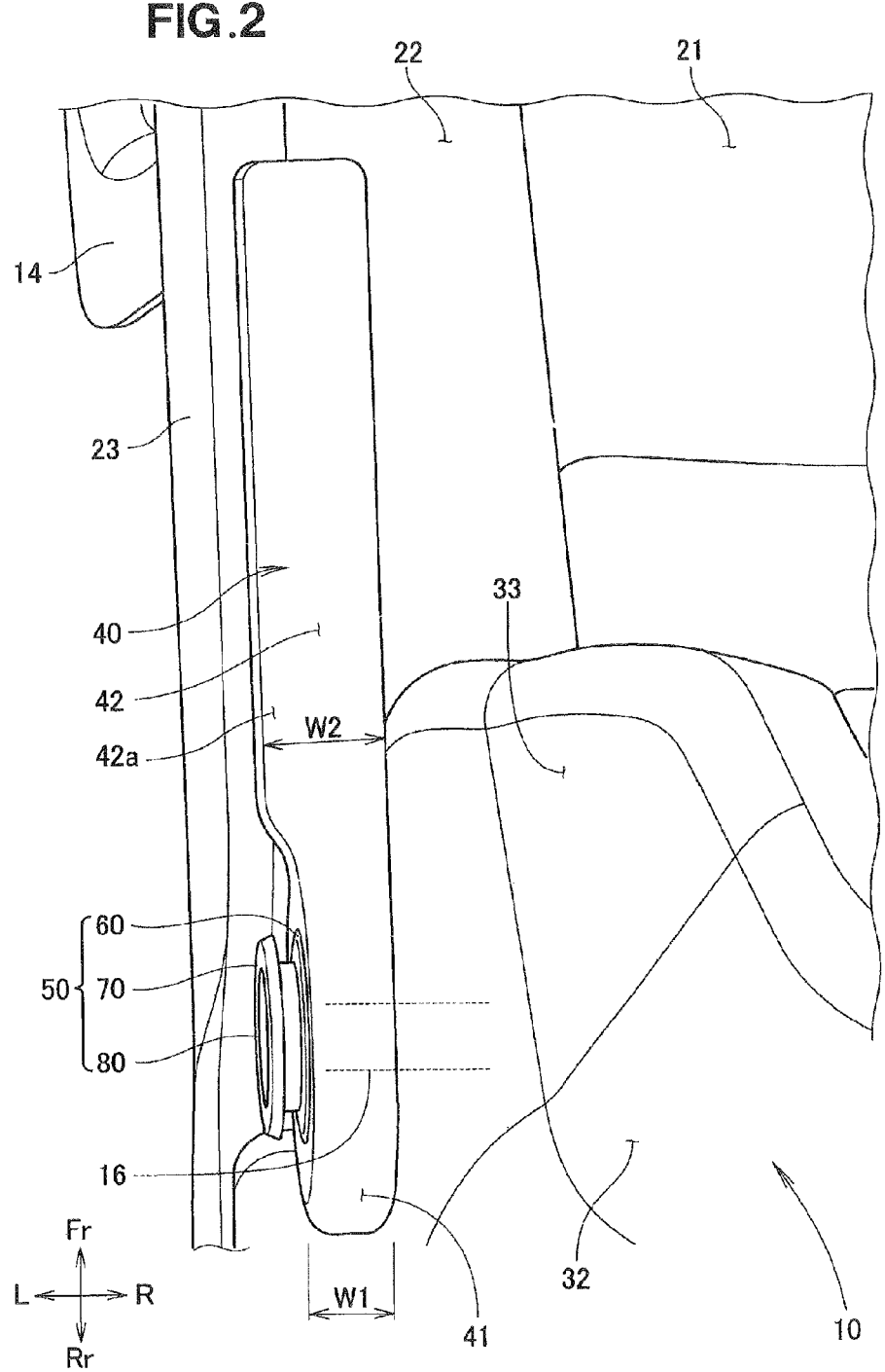
FIG. 2 is a top plan view of an armrest of the automobile seat shown in FIG. 1.

As shown in FIG. 2, the armrest 40 is pivotably mounted to undergo pivotal movement in the forward and backward directions about a shaft member 16 fixed to the left lateral portion 33 of the seatback 30.

A hook member 50 is attached to a distal end of the shaft member 16 so as to allow baggage or articles to be hooked on the hook member 50.

The armrest 40 includes a mounting portion 41 provided for attachment thereto of the hook member 50, and a central portion 42 located in the vicinity of a longitudinally central part of the armrest 40. The mounting portion 41 of the armrest 40 has a width W1, and the central portion 42 has a width W2 set to be larger than the width W1 of the mounting portion 41.

In the illustrated embodiment, the hook member 50 has a distal end located closer to a widthwise center of the seat 10 than a lateral outer end 42a of the central portion 42 does. In other words, the hook member 50 does not project outwardly beyond the lateral outer end 42a of the armrest 40.

Figure 3:
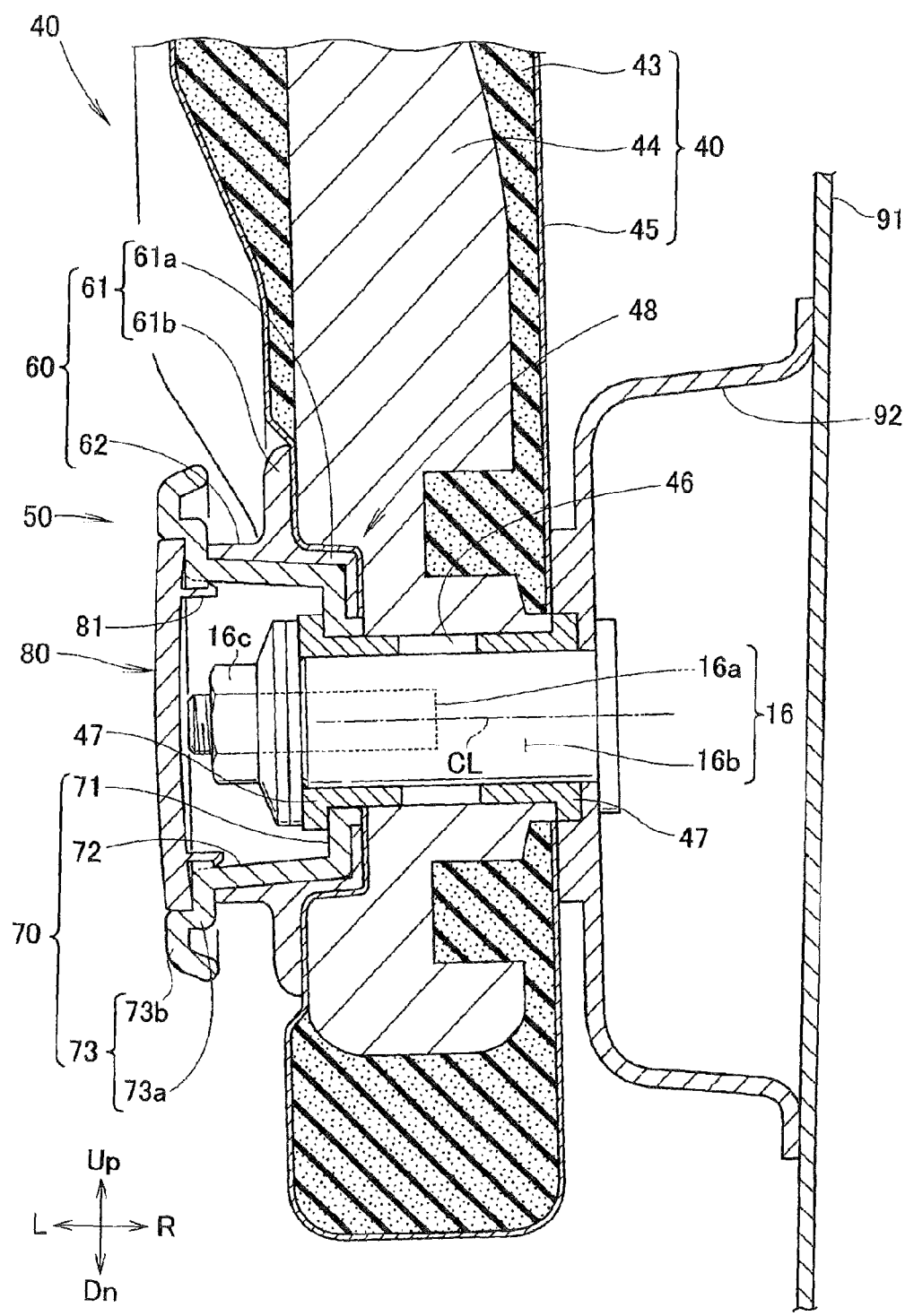
FIG. 3 is a cross-sectional view taken along line 3-3 of FIG. 1.

Referring next to FIG. 3, which is a cross-sectional view of the armrest 40 taken along a line extending across a part of the armrest 40 to which the hook member 50 is attached.

The seatback 30 (FIG. 1) includes a seatback frame 91, and a mount member 92 fixedly connected to a lateral side of the seatback frame 91.

The armrest 40 is constituted by a body 44, a cushioning material 43 enclosing the body 44, and a skin layer 45 covering the cushioning material 43. The armrest 40 has a shaft hole 46 formed therein for receiving the shaft member 16. The shaft member 16 is formed by insert molding and includes a bolt 16a made of metal and a core 16b made of metal, the bolt 16a being firmly embedded or anchored in the core 16b.

The body 44 of the armrest 40 has a recessed portion 48 formed in a lateral outer side thereof. The recessed portion 48 is recessed toward a widthwise or lateral inward direction of the seat in such a manner as to surround the shaft member 16. The recessed portion 48 has a circular shape having a center located on an axis of the shaft member 16. The recessed portion 48 may have a polygonal shape.

The hook member 50 is fitted in the recessed portion 48 and mounted on the shaft member 16 together with the armrest 40 via a pair of collars 47, 47. The bolt 16a projects in a lateral outward direction of the seat and is fastened with a flanged nut 16c.

The hook member 50 is constituted by a first cover member 60 disposed on a front surface of that part of the skin layer 43 which extends around the shaft member 16, a second cover member 70 fitted in the first cover member 60, and a cap member 80 attached to the second cover member 70 so as to cover a distal end of the shaft member 16.

The first cover member 60 includes a presser portion 61 for pressing the skin layer 43 in such a manner that the skin layer 43 is gripped between the presser portion 61 and the body 44 of the armrest 40, and a baggage engagement portion 62 extending from the presser portion 61 in the lateral outward direction of the seat for allowing a piece of baggage to be hooked on the baggage engagement portion 62.

The presser portion 61 includes an inner presser section 61a fitted in the recessed portion 48 and configured to press a first part of the skin layer 43 which is located inside the recessed portion 48, and an outer presser section 61b configured to press a second part of the skin layer 43 which is located on a periphery of an open edge of the recessed portion 48. The inner presser section 61a has a bottom having a hole formed therein, and the shaft member 16 extends through the hole.

The second cover member 70 includes a bottom portion 71 being in contact with the bottom of the inner presser section 61a, a peripheral wall portion 72 extending from an outer peripheral edge of the bottom portion 71 in the lateral outward direction of the seat, and a flange portion 73 extending from a distal end of the peripheral wall portion 72 in a direction substantially perpendicular to an axis CL of the shaft member 16 for preventing the baggage from displacing off the hook member 50. The bottom portion 71 has a hole for allowing the passage therethrough of the shaft member 16.

The flange portion 73 includes a straight section 73a extending in the lateral outward direction of the seat, and a folded section 73b extending from a distal end of the straight section 73a in the lateral inward direction of the seat. The folded section 73b has a diameter increasing continuously in the lateral inward direction of the seat.

The peripheral wall portion 72 has a truncated cone shape having an outside diameter decreasing gradually in the lateral inward direction of the seat. In the state where the second cover member 70 is fitted in the first cover member 60, the peripheral wall portion 72 is in contact with the baggage engagement portion 62. To this end, the baggage engagement portion 62 has a truncated cone shape having an inside diameter decreasing gradually in the lateral inward direction of the seat.

The cap member 80 has a locking prong 81 extending in the lateral inward direction and lockingly engaged with a part of the peripheral wall portion 72.

Figure 4:
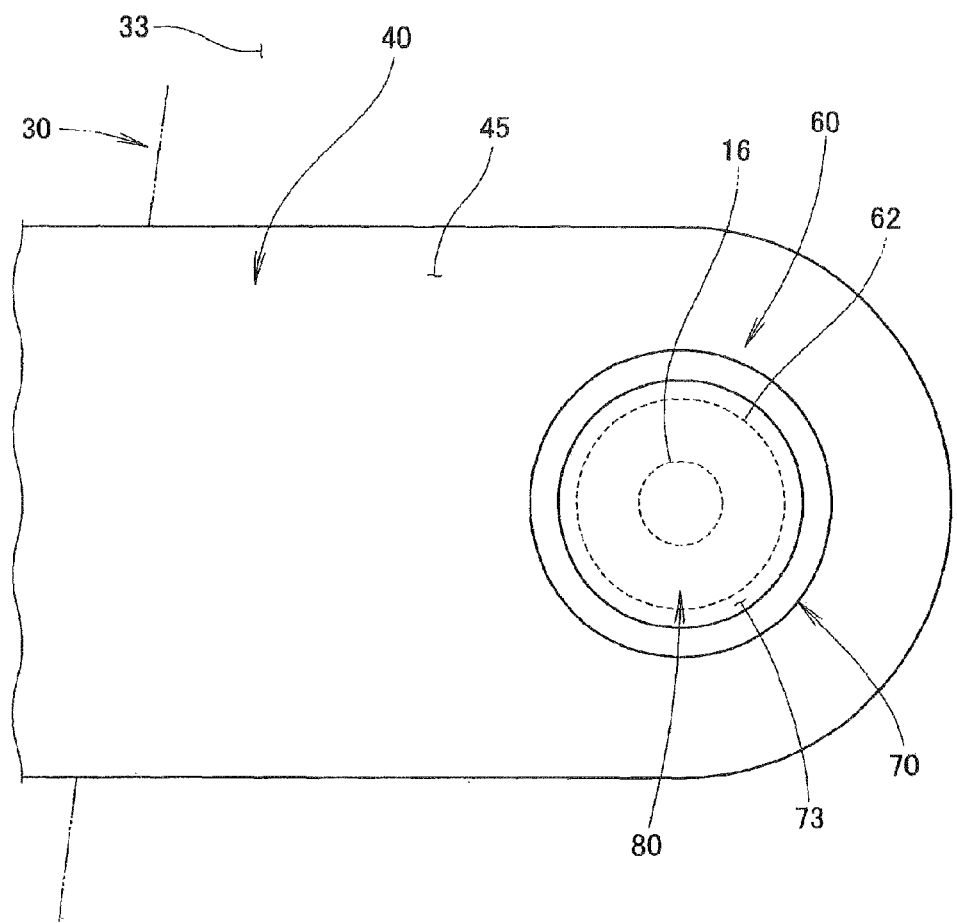
FIG. 4 is a side view of the armrest of the automobile seat shown in FIG. 1.

Referring next to FIG. 4, when viewed from a lateral side of the seatback 30, the baggage engagement portion 62 of the first cover member 60 and the flange portion 73 of the second cover member 70 have circular shapes having a common center coincident with the axis of the shaft member 16.

Figure 5:
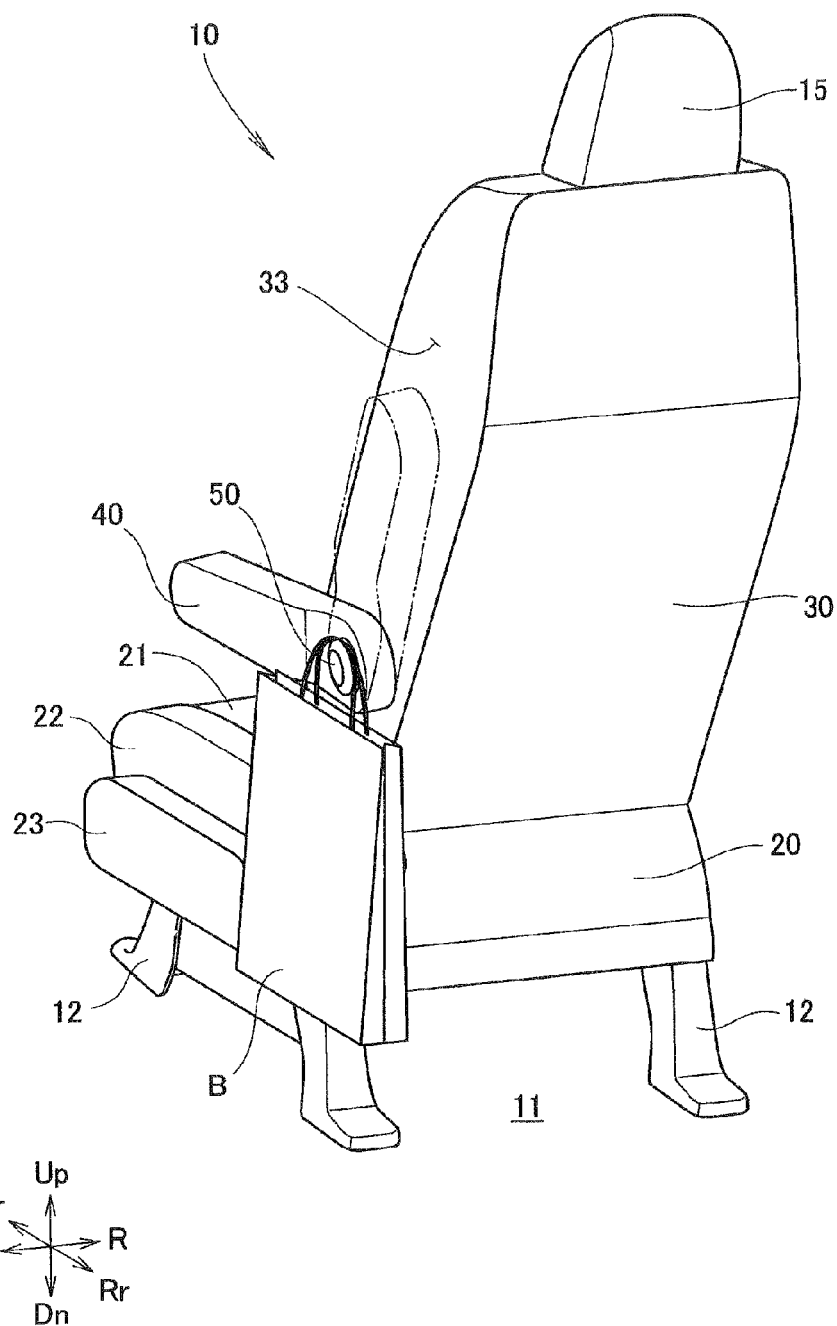
FIG. 5 is a view illustrative of the operation of the automobile seat.

Operation and advantageous effects of the present invention will be described. As shown in FIG. 5, the armrest 40 of the automobile seat 10 is pivotably mounted to undergo pivotal movement in the forward and backward directions of the seat about the shaft member 16 (FIG. 2) fixed to the lateral portion 33 of the seatback 30, and the hook member 50 is provided on the arm rest 40 for allowing baggage or articles to be hooked on the hook member 50. With this arrangement, a hand-grip of a bag B can be hooked on the lateral side of the automobile seat 10.

Referring also to FIG. 3, the body 44 of the armrest 40 has the recessed portion 48 recessed in the lateral inward direction of the seat in such a manner as to surround the shaft member 16. The hook member 50 is attached to the distal end of the shaft member 16 and fitted in the recessed portion 48.

The hook member 50 is therefore supported by the shaft member 16 and the body 44 of the armrest 40. The shaft member 30 is attached to the lateral portion 33 of the seatback 30 and has a high mounting strength. Since the hook member 50 is directly attached to the shaft member 16 having high mounting strength, and since the hook member 50 is fitted in the body 44 of the armrest 40, a mounting strength of the hook member 50 is very high. The hook member 50 can thus possess an enhanced mounting strength with respect to the automobile seat 10.

The second cover member 70 has the flange portion 73 located at the distal end of the baggage engagement portion 62 and extending in a direction substantially perpendicular to the axis CL of the shaft member 16 for preventing the baggage from displacing off the hook member 50. In the illustrated embodiment, the flange portion 73 includes the straight section 73a extending in the lateral outward direction of the seat, and the folded portion 73b extending from the straight portion 73a in the lateral inward direction of the seat. With the flange portion 73 thus arranged, a part of the baggage (such as a hand-grip of the bag B) which is hooked on the baggage engagement portion 62 of the hook member 50 is likely to enter a space defined between the straight section 73a and the folded section 73b and can thus be held reliably in position against detachment.

As show in FIG. 4, since the baggage engagement portion 62 of the first cover member 60 and the flange portion 73 of the second cover member 70 have circular shapes having a common center coincident with the axis of the shaft member 16 when viewed in a lateral side of the seatback 30, an angle of inclination (or swing angle) of the armrest 50 does not affect the usability of the hook member 50. The hook member 50 can thus possess a higher degree of usability.

Referring back to FIG. 2, since the width of the armrest 40 is set to be wider at the central portion 42 than at the mounting portion 41, an amount of projection of the hook member 50 in the lateral outward direction of the seat can be suppressed even though the hook member 50 is attached to the shaft member 16. As a result, the baggage hooked on the hook member 50 has a limited amount of projection in the lateral outward direction of the seat. This arrangement ensures that the baggage can be hooked on the hook member 50 with a limited occupation of space provided on a lateral side of the automobile seat 10.

Particularly in the illustrated embodiment, the distal end of the hook member 50 is located on a lateral inward side of the lateral outer end 42a of the central portion 42 of the armrest 40. In other words, the hook member 50 does not project outwardly beyond the lateral outer end 42a of the armrest 40. A space occupied by the armrest 40 provided with the hook member 50 is the same as a space occupied by a regular armrest provided with no hook member. The automobile seat 10 having the hook member 50 has a higher degree of versatility.

The automobile seat 10 can be used for a driver's seat for a left steering wheel vehicle in which instance the armrest 40 is attached to a right side portion of the seatback 30. The present invention can be effectively used for application to trains, airplanes, ships, etc. Furthermore, the metal core 16b of the shaft member 16 may be replaced by a resin core according to a load resistance required for the hook member 50. The present invention should by no means be limited to the illustrated embodiment provided that the foregoing operation and advantageous effects can be achieved.

The present invention is particularly advantageous when embodied in an automobile seat as a typical example of vehicle seats.

Obviously, various minor changes and modifications of the present invention are possible in light of the above teaching. It is therefore to be understood that within the scope of the appended claims the invention may be practiced otherwise than as specifically described.

What is claimed is:

1. A vehicle seat comprising:
    a seatback;
    an armrest mounted on a lateral portion of the seatback; and
    a hook member provided on the armrest for allowing baggage to be hooked on the hook member,
    wherein the armrest includes a body covered with a skin layer and is pivotably mounted to undergo pivotal movement in forward and backward directions about a shaft member fixed to the lateral portion of the seatback,
    wherein the body of the armrest has a recessed portion formed therein and recessed in a widthwise inward direction of the seat in such a manner as to surround the shaft member,
    wherein the hook member is attached to a distal end of the shaft member and fitted in the recessed portion,
    wherein the hook member includes a presser portion for pressing the skin layer with the skin layer gripped between the presser portion and the body of the armrest, a baggage engagement portion extending from the presser portion in a widthwise outward direction of the seat for hooking engagement with the baggage, and a flange portion located at a distal end of the baggage engagement portion and extending in a direction substantially perpendicular to an axis of the shaft member for preventing the baggage from displacing off the hook member, and
    wherein the flange portion extends in the direction substantially perpendicular along an entire circumference of the baggage engagement portion.

2. The vehicle seat according to claim 1, wherein the flange portion includes a folded section extending in the widthwise inward direction of the seat.

3. The vehicle seat according to claim 1, wherein the baggage engagement portion and the flange portion have circular shapes having a common center coincident with an axis of the shaft member when viewed in a lateral side of the seatback.

4. The vehicle seat according to claim 1, wherein the armrest includes a first portion provided for attachment thereto of the hook member, and a second portion located forwardly of the first portion, and the armrest has a width set to be larger at the second portion than at the first portion.

5. The vehicle seat according to claim 1, wherein a collar is fitted on the shaft and fixedly secured to the shaft, and
   wherein the baggage engagement portion transfers a force from a load of the baggage onto the collar fitted on the end of the shaft.

6. The vehicle seat according to claim 1, wherein the baggage engagement portion comprises a continuous surface forming a shape having a common center with an axis of the shaft.

7. The vehicle seat according to claim 1, wherein a center of the flange is concentric with an axis of the shaft.

8. The vehicle seat according to claim 1, wherein the flange portion extends outwardly from the baggage engagement portion with respect to an axis of the shaft.

9. The vehicle seat according to claim 1, wherein the baggage engages with the baggage engagement portion on a surface of the baggage engagement portion facing outwards from the shaft.

* * * * *